Oct. 2, 1928.

C. H. MORROW

WATER HEATER

Filed Sept. 27, 1924

1,685,857

2 Sheets-Sheet 1

Inventor
Clarence H. Morrow
By Brockett, Hyde & Milburn
Attorneys

Oct. 2, 1928.

C. H. MORROW

WATER HEATER

Filed Sept. 27, 1924

1,685,857

2 Sheets-Sheet 2

Inventor
Clarence H. Morrow
By Brockett, Hyde & Milburn
Attorneys

Patented Oct. 2, 1928.

1,685,857

UNITED STATES PATENT OFFICE.

CLARENCE H. MORROW, OF CLEVELAND, OHIO, ASSIGNOR TO THE HOTSTREAM HEATER COMPANY, OF CLEVELAND, OHIO, A CORPORATION OF OHIO.

WATER HEATER.

Application filed September 27, 1924. Serial No. 740,227.

This invention relates to water heaters.

The object of the invention is to provide an improved water heater so arranged as to be capable of convenient assembly on the job and readily adjustable to enable the incoming gas to be led to the heater through a side feed mixer from either side or from the rear, as may be most convenient, and in which the castings are reduced in number and are of simple form adapted to firmly support the jacket and with proper provision for collection of condensation, soot and refuse.

Another object of the invention is to provide a water heater in which the burner supporting member is readily attached to and disconnected from the casing base and when so attached is firmly and rigidly supported and is held or locked in place by a single, easily removable member.

Further objects of the invention are in part obvious and in part will appear more in detail hereinafter.

Figure 1:
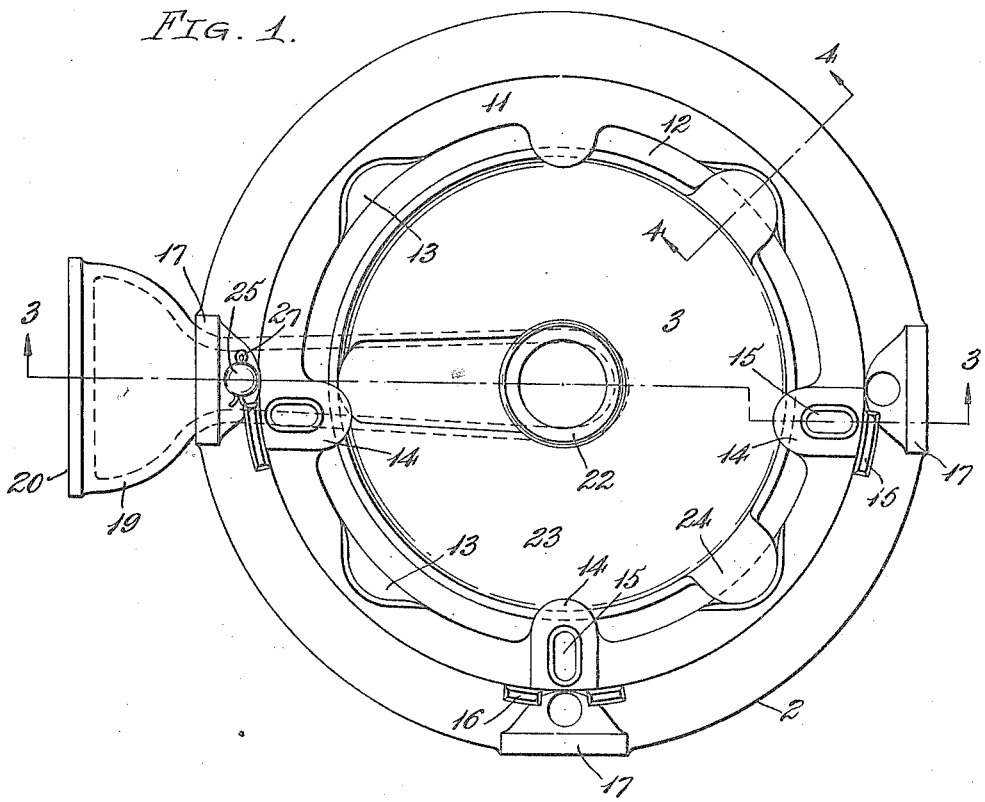
Figure 2:
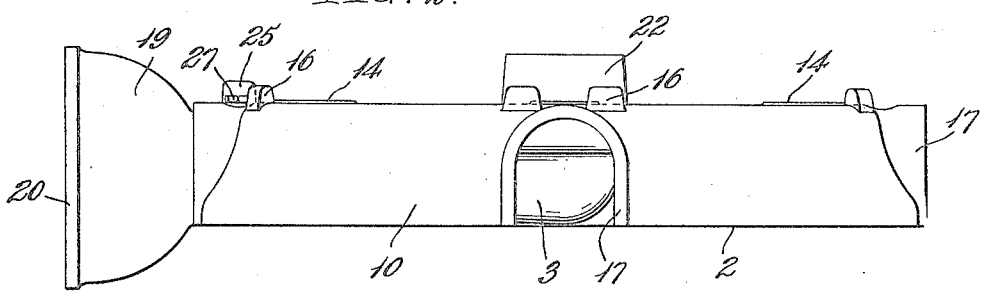
Figure 3:
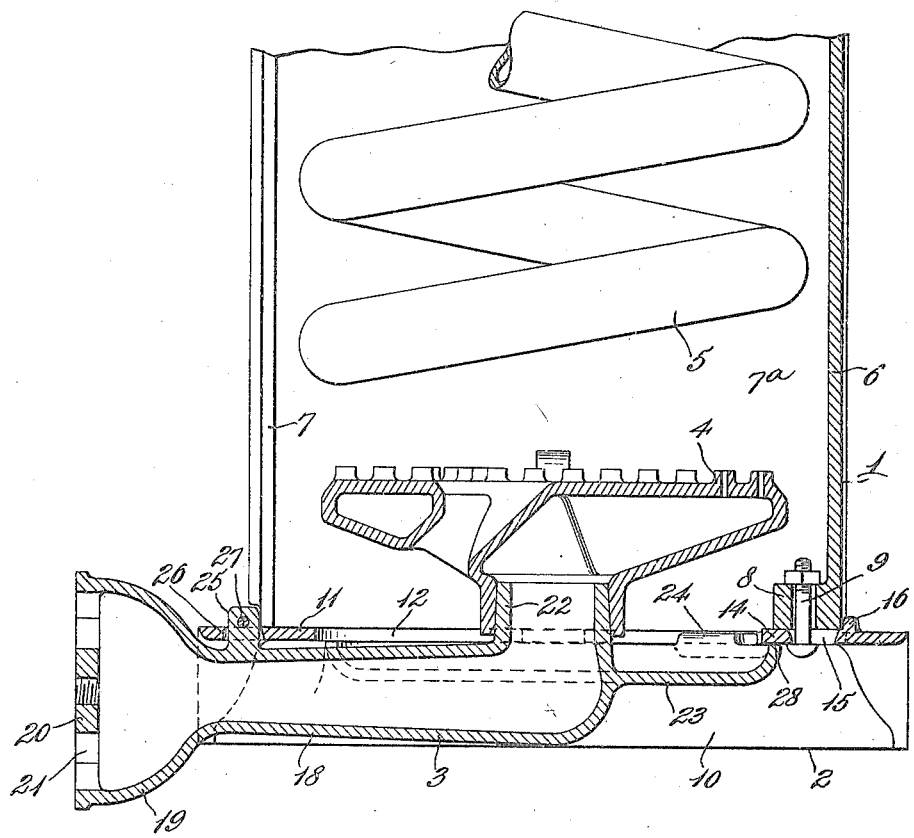
Figure 4:
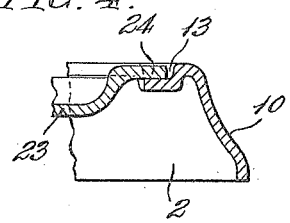

In the drawings, which represent one suitable embodiment of the invention, Fig. 1 is a plan view of the lower portion of the heater, the coils and jacket or casing being omitted; Fig. 2 is an elevation thereof; Fig. 3 is a cross section on the line 3—3, Fig. 1, looking in the direction of the arrows, the section being taken from side to side of the heater and looking toward the door or door opening; and Fig. 4 is a detail section on the line 4—4, Fig. 1.

The heater shown in the drawings comprises a jacket or casing 1, a base or support 2 therefor, a combined mixer and refuse and moisture collector 3, a burner 4, and suitable means for subjecting the flowing water to the heating effect, such as the coils 5 or the like, and which coils or water conducting member require no further description because they form no part of the present invention.

The jacket or casing 1 is of the usual form in that it embodies a relatively stationary portion 6 and one or more doors 7 hinged thereto and closing the opening to the combustion or heating chamber 7ª. The stationary casing member is of semi-cylindrical form and its lower edge is provided with several, for example three, inwardly extending notched or perforated ears or lugs 8 to receive the bolts 9 for securing it to the base 2. The door 7, Fig. 1, is not fully illustrated, but is of usual form with the customary hinges and latch and need not be further described.

The base 2 of the heater generally speaking, is of inverted pan form having the peripheral skirt 10 with an upper horizontal wall having a large central portion thereof omitted to form an annular horizontal flange 11 surrounding the central opening 12, said flange being depressed at several points, four being shown, to provide seats or recesses 13 distributed regularly around the center. Portions of the flange also extend inwardly at intervals into said opening to form several, say three, inwardly extending ears or lugs 14 some of which are provided with radially elongated slots 15. The slotted ears form seats for the perforated lugs 8 of the jacket and the securing bolts 9 pass through the slots 15, as shown in Fig. 3, enabling the jacket to be readily adapted to a stock base with a proper fit regardless of slight inaccuracies in the castings. The jacket may be held against lateral motion and is supported from the outside by a series of raised lugs 16 on the base properly distributed around the skirt. The skirt is also provided at several points distributed around its periphery with outwardly extending open sided recessed bosses 17, said recesses opening downwardly and being of arched form and of size large enough to receive the shank of the mixer. Several of these openings are provided to enable the mixer to be attached to the base in several different positions according to the requirements of the particular plumbing installation and the consequent advisability of leading gas to the burner from one particular direction rather than from another. In the form shown three such recesses are illustrated, one on either side and one at the rear.

Member 3, before referred to, is usually a casting and combines the usual side feed mixer with a refuse and condensation collector. It is in the form of an L-shaped conduit with the outer end of its shank 18 terminating in an enlargement 19, the end wall 20 of which is provided with ports 21 for the air regulating rotary valve plate, not shown, as is usual. The inner end or neck 22 of said conduit when in place in the heater extends upwardly along its central vertical axis and forms a perch or support upon which the burner 4 is supported. Said burner may be of any suitable form and, for example, is illustrated as of the construction shown in a prior application of Louis R. Mendelson, for burner, filed April 21, 1924, Serial No. 707,916, to which reference may be had for a complete description thereof if necessary. Cast integrally with the mixing pipe is a shallow pan shaped member 23 of slightly smaller diameter than the opening 12 in the flange of the base and which pan shaped member is located directly beneath the burner 4 and collects and holds soot and other refuse and moisture of condensation until it evaporates or is otherwise distributed to the air. At intervals around its periphery, or more accurately at two places, in the form shown, the collecting pan 23 is provided with outwardly extending ears 24.

In assembling the heater the base and jacket are first connected and are rigidly fastened together by the bolts 9. The member 3 is then inserted into position with its shank 18 in that one of the recesses 17 which will enable the gas to be led to the heater from the proper direction. It is cocked and pushed up into place by radial motion until its two ears 24 ride over and rest upon two of the seats 13 in the skirt flange before referred to. The outer end of the mixer is then raised until the teat or lug 25 thereon passes through an opening 26 in the upper portion of the base, member 3 being then locked or held in place by pushing a cotter pin 27 through an opening in said lug. In this position the mixing member 3 is firmly and rigidly held against movement by the support of its ears 24 in the seats 13 and the engagement of the periphery of the pan shaped member 23 beneath the ends of the inwardly extending lugs 14, as at 28, Fig. 3.

With the arrangement shown a gas water heater may be located in the cellar with its door facing in the proper or any desired direction and the gas nevertheless may be led to it from a position determined by the preferable arrangement of the gas piping system. In addition, the castings have been simplified and reduced in number.

Other objects of the invention will be apparent to those skilled in the art.

What I claim is:

1. A water heater, comprising a casing provided with a front door opening and a base having a skirt, and a side feed burner mixer having a horizontally extending portion extending through the skirt, said base being formed to receive said mixer in a plurality of different positions.

2. A water heater, comprising a casing provided with a front door and with a base having a skirt, and a side feed burner mixer having a single laterally extending portion, said skirt being provided with means enabling the laterally extending portion of said mixer to extend through said skirt at any selected one of a plurality of points therein, and means for maintaining said mixer portion in such selected position.

3. In a gas fuel water heater, a base member in the form of an inverted shallow pan having a central opening, the depending skirt of said base member being provided with a series of circumferentially spaced recesses opening downwardly through the edge of the skirt and through which a side feed conduit may extend.

4. In a gas fuel water heater, a base member in the form of an inverted shallow pan having a central opening, the depending skirt of said base member being provided with a series of circumferentially spaced recesses opening downwardly through the edge of the skirt and through which a side feed conduit may extend, and a fuel feed member therefor having a shank adapted to extend through one of said recesses and to be inserted thereinto from beneath and at its opposite end having means adapted to extend above a portion of said base member to be supported thereby.

5. In a gas fuel water heater, a base member in the form of an inverted shallow pan having a central opening, the depending skirt of said base member being provided with a series of circumferentially spaced recesses opening downwardly through the edge of the skirt and through which a side feed conduit may extend, a fuel feed member therefor having a shank adapted to extend through one of said recesses and to be inserted thereinto from beneath and at its opposite end having means adapted to extend above a portion of said base member to be supported thereby, and means for securing said shank to said base member for locking the feeding member in place.

6. A water heater, comprising a jacket or casing, a base, a combined side feed mixer and refuse collecting member, interlocking connections between said base and member for preventing relative movement therebetween, and a single fastening means for detachably securing said base and member together.

7. A water heater, comprising a jacket or casing, a base therefor provided with a series of circumferentially spaced recesses, and a side feed burner mixer having a horizontally extending shank and adapted to be assembled with the base with its shank lying in any one of said recesses.

8. A water heater, comprising a jacket or casing, a base therefor provided with a series of circumferentially spaced recesses, a side feed burner mixer having a horizontally extending shank adapted to be assembled with the base with its shank lying in any one of said recesses, and a seat for the mixer lying opposite each recess.

9. A water heater, comprising a jacket or casing, a base therefor provided with a series of circumferentially spaced recesses, and a side feed burner mixer having a horizontally extending shank adapted to be assembled with the base with its shank lying in any one of said recesses, said base and mixer member opposite each recess being provided with interlocking means arranged to prevent relative vertical movement therebetween.

10. A water heater, comprising a jacket or casing, an annular base therefor having a depending skirt provided with circumferentially spaced recesses, and a side feed burner mixer having a shank adapted to lie in any one of said recesses and having integrally formed therewith a pan shaped horizontally extending refuse collecting member.

11. A water heater, comprising a jacket or casing, an annular base therefor having a depending skirt provided with circumferentially spaced recesses, a side feed burner mixer having a shank adapted to lie in any one of said recesses and having integrally formed therewith a pan shaped horizontally extending refuse collecting member, and interlocking connections between said base and refuse collecting member.

In testimony whereof I hereby affix my signature.

CLARENCE H. MORROW.